United States Patent [19]

Hoefs

[11] Patent Number: 4,598,108

[45] Date of Patent: Jul. 1, 1986

[54] WATER REDUCIBLE COMPOSITION BASED ON AN EPOXY RESIN

[75] Inventor: Cornelis A. M. Hoefs, Elst, Netherlands

[73] Assignee: Akzo NV, Arnhem, Netherlands

[21] Appl. No.: 749,398

[22] Filed: Jun. 27, 1985

[30] Foreign Application Priority Data

Jul. 6, 1984 [NL] Netherlands ................. 8402166

[51] Int. Cl.$^4$ .................. C08L 63/00; C08K 5/41; C08K 5/32
[52] U.S. Cl. ..................... 523/411; 252/182; 427/386; 523/414; 523/420; 523/426; 523/453; 523/454; 523/455; 525/113; 525/504; 528/88; 528/90
[58] Field of Search ............... 523/414, 420, 426, 411, 523/453, 454, 455; 525/113, 504; 528/88, 90; 252/182; 427/386

[56] References Cited

U.S. PATENT DOCUMENTS

| | | | |
|---|---|---|---|
| 3,534,124 | 10/1970 | Howard et al. | 523/455 X |
| 3,649,583 | 3/1972 | Guthrie | 523/455 X |
| 3,888,812 | 6/1975 | Plettner | 523/426 |

*Primary Examiner*—Earl Nielsen
*Attorney, Agent, or Firm*—Parkhurst & Oliff

[57] ABSTRACT

The invention provides a water-reducible coating composition comprising an epoxy resin, an amino group-containing curing agent for the epoxy resin and a water-soluble organic compound which occurs in at least 2 tautomeric forms, in one of which a labile hydrogen atom is linked to a carbon atom and which compound contains at least one carbonyloxy group or sulfonyl group.

7 Claims, No Drawings

WATER REDUCIBLE COMPOSITION BASED ON AN EPOXY RESIN

The invention relates to a water-reducible coating composition based on an epoxy resin, an amino group-containing curing agent for it and an emulsifying auxiliary compound. Water-reducible compositions have the considerable advantage that upon their application no or only little organic solvent is released into the atmosphere. Moreover, the use of water will diminish physiological drawbacks and fire and explosion hazards. A composition of the above type is described in British Patent Specification No. 2 075 022, use being made of a nitroalkane for emulsifying the epoxy resin and the curing agent in the aqueous phase. That composition is curable at ambient temperature and can advantageously be applied as coating composition for the protection of metal surfaces of ships, aircraft, vehicles and bridges. The coatings thus obtained display a very high resistance to, for instance, organic solvents and water.

Surprisingly, Applicant has found that another group of organic compounds in the composition exerts a proper emulsifying effect on the epoxy resin and the curing agent for it.

The composition according to the invention is characterized in that the emulsifying auxiliary compound is a water soluble organic compound occurring in at least 2 tautomeric forms, in one of which a labile hydrogen atom is linked to a carbon atom and which compound contains at least one carbonyloxy group or sulfonyl group. By a water soluble compound is to be understood here a compound having a solubility of at least 0,2 g per 100 g of water having a temperature of 20° C.

By an epoxy resin is to be understood here a compound having at least 1, but preferably at least 2 epoxy groups per molecule. As examples of suitable epoxy resins which may be solid or liquid as such may be mentioned the mono-, di- or polyglycidyl ethers of (cyclo)aliphatic or aromatic hydroxyl compounds, such as allyl alcohol, butanol, cyclohexanol, phenol, butyl phenol, decanol, ethylene glycol, glycerol, cyclohexane diol, mononuclear di- or trifunctional phenols, bisphenols such as Bisphenol-A and Bisphenol-F, and multinuclear phenols; polyglycidyl ethers of phenolformaldehyde novolac; polymers of ethylenically unsaturated compounds with epoxy groups such as glycidyl (meth)acrylate, N-glycidyl (meth)acrylamide and/or allyl glycidyl ether, and optionally of one or more other copolymerizable ethylenically unsaturated monomers; cycloaliphatic epoxy compounds such as epoxidized and, optionally, successively hydrogenated styrene or divinyl benzene; glycidyl esters of fatty acids containing, for instance, 6-24 carbon atoms; glycidyl (meth)acrylate; isocyanurate group-containing epoxy compounds; an epoxidized polyalkadiene such as epoxidized polybutadiene; hydantoin epoxy resins; epoxy resins obtained by epoxidizing aliphatic and/or cycloaliphatic alkenes, such as dipentene dioxide, dicyclopentadiene dioxide and vinylcyclohexene dioxide and glycidyl groups-containing resins such as polyesters or polyurethanes which contain one or more glycidyl groups per molecule, or mixtures of the above-envisaged epoxy resins. Generally, the above-envisaged monoepoxy compounds are used along with the di- or polyepoxy compound(s), but there is no absolute need for that. The epoxy resins are known to a man skilled in the art and need not be further described here.

It is preferred that the epoxy resin used should be a compound of the following general formula:

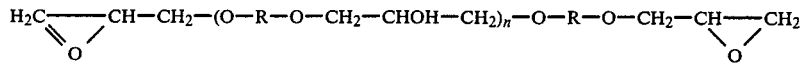

wherein R represents an aliphatic, cycloaliphatic or aromatic group and n is a number between 0 and 150, preferably between 0 and 60. As examples of such epoxy resins may be mentioned the glycidyl ethers of ethylene glycol, diethylene glycol, triethylene glycol, 1,2-propane diol, 1,3-propane diol, 1,4-butane diol, 1,5-pentane diol, bis(4-hydroxycyclohexyl)-2,2-propane, 4,4'-dihydroxybenzophenone, cyclohexane diol, bis-(4-hydroxyphenyl)methane, bis-(4-hydroxyphenyl)-1,1-ethane, bis-(4-hydroxyphenyl)-1,1-isobutane and 1,5-dihydroxy naphthalene. Optionally, use may be made of polyglycidyl ethers of compounds such as glycerol, trimethylol ethane, trimethylol propane of 1,2,6-hexane triol. More particularly, use is made of a diglycidyl ether based on bis-(4-hydroxyphenyl)-2,2-propane. The epoxy equivalent weight of the epoxy resin(s) is preferably 87-6000, more particularly 120-1000.

The amino compound which may be used as curing agent for the epoxy resin is generally a compound containing at least 1 and preferably at least 2 primary or secondary amino groups per molecule. The compounds may be low molecular weight compounds or high molecular weight compounds. Optionally, use may be made of mixtures of amino compounds. Examples of suitable low molecular weight amino compounds include monoamines, such as 2-aminoethyl mercaptan, diamines, such as ethylene diamine, isophoron diamine and/or xylylene diamine, and poly amines such as diethylene triamine, dipropylene triamine and/or triethylene tetramine, and mixtures of such polyamino compounds.

Examples of suitable high molecular weight polyamino compounds include polyamidoamino resins; addition products of primary amines to compounds having 2 or more epoxy groups; polymers of amino (meth)acrylates with primary or secondary amino groups, and amino-groups containing polymers of ethylenically unsaturated compounds with primary or secondary amino groups. These high molecular weight polyamino compounds generally have an amino equivalent weight of 70-475, preferably of 95-240. As examples of representative polyamidoamino resins may be mentioned the resins that may be obtained by polycondensation of one or more di- or polyvalent polyamines, such as ethylene diamine, diethylene triamine or triethylene tetramine, with one or more dicarboxylic acids, for instance: adipic acid, azelaic acid and a dimerized fatty acid, such as dimerized tall oil fatty acid or dimerized soy bean oil fatty acid. The polycondensation may optionally be carried out in the additional presence of a monocarboxylic acid.

Examples of suitable curing agents are the addition products of an amine with at least a primary or secondary amino group, such as ethanol amine, butyl amine, diethyl amine, ethylene diamine, diethylene triamine and a polyamido amine to a compound having 2 or more epoxy groups. Suitable starting epoxy compounds are, for example, the above-described epoxy resins.

Examples of suitable curing agents include the homo- or copolymers of amino (meth)acrylates such as aminoethyl (meth)acrylate, aminobutyl (meth)acrylate, methyl aminoethyl(meth)acrylate and/or hydroxyethyl aminoethyl (meth)acrylate, and optionally of one or more copolymerizable ethylenically unsaturated compounds, such as methyl (meth)acrylate, ethyl (meth)acrylate, butyl (meth)acrylate, 2-ethylhexyl (meth)acrylate, (meth)acrylonitrile, 2-hydroxyethyl (meth)acrylate, glycidyl (meth)acrylate, styrene, α-methyl styrene, vinyl toluene, vinyl acetate, vinyl chloride and/or vinyl isobutyl ether. Examples of other suitable curing agents include ketimines of the afore-described primary and/or secondary amines with ketones, such as methylethyl ketone, diethyl ketone, methylisobutyl ketone or methylamyl ketone.

The afore-described curing agents are generally known and need not to be further described here (see, for instance, Lee and Neville, Handbook of Epoxy Resins, Mc Graw Hill, New York).

In the composition the ratio of the number of active hydrogen atoms of the amino compound to the number of epoxy groups of the epoxy resin is 0.4–1.5 and preferably 0.6–1.2; more particularly the amino compound is present in an amount such that the molar ratio of reactive amino groups to epoxy groups is 0.95–1.05.

According to the invention the water-reducible composition also contains a particular organic compound which occurs in at least 2 tautomeric forms, in one of which a labile hydrogen atom is linked to a carbon atom. For simplicity, these compounds are hereinafter referred to as CH acid. Examples of suitable CH acids include phenyl-sulfonyl-propanone-2, methyl-sulfonyl-acetone, and esters, for instance those of a (cyclo)aliphatic or aromatic hydroxyl compound having 1–10 carbon atoms, such as methanol, ethanol, propanol, butanol, hexanol, cyclohexanol, phenol, ethylene glycol, glycerol, trimethylol ethane and trimethylol propane, with a carboxylic acid such as nitroacetic acid, cyanoacetic acid, monochloroacetic acid, 3-chloropropionic acid, trifluoracetoacetic acid or of acetyl acetic acid. Examples of suitable esters include ethyl nitroacetate, cyclohexyl nitroacetate, benzyl cyanoacetate, methyl acetoacetate, ethyl acetoacetate and methyl 3-chloropropionate. It is preferred that use should be made of an alkyl cyanoacetate or an alkyl monochloroacetate, more particularly of the methyl ester or ethyl ester of cyanoacetic acid or of monochloroacetic acid. The CH acid generally has a pKa of 3–12, preferably of 4–11, and more particularly of 6½–9. The CH acid is generally employed in an amount such that 0.25–2 labile hydrogen atoms of the CH acid are present per nitrogen atom of the amino group-containing curing agent.

The water-reducible coating composition can be formed from the epoxy resin, the amino compound and the CH acid in any suitable manner. It is preferred that the epoxy resin should be dissolved in one or more organic solvents for it and subsequently mixed with a solution of the curing agent in an organic solvent for it. In actual practice the CH acid is added either to the epoxy resin solution or to the common solution of the epoxy resin and the curing agent. To obtain the desired application viscosity water may finally be added to the resulting solution. The water-reducible composition may contain the usual additives, such as pigments, fillers, levelling agents, anti-foam agents, anti-sag agents, corrosion inhibiting agents, catalysts for curing the epoxy compound, and inert organic solvents, such as aliphatic or aromatic hydrocarbons, and solvents such as glycol ether, e.g. butyl glycol or propylene glycol monomethyl ether, and esters thereof.

The coating composition ready for use may generally contain at least 30% by weight of water, preferably at least 40% by weight of water.

The coating composition may be applied to the substrate in any desirable manner, for instance by roller coating, spraying, brushing, sprinkling, flow coating or dipping.

The substrate may be of a metal, such as aluminium, magnesium, steel, iron, titanium, or of a synthetic material such as a fibre-reinforced epoxy resin, polyetherether ketone, polyimide or polyester. The substrate may optionally be pre-treated. The coating composition is preferably applied as primer in the aircraft industry. The coating composition is generally cured at ambient temperature or at a somewhat elevated temperature of, for instance, up to 80° C. The thickness (after curing) of the coating is generally 5–25 μm, preferably 10–20 μm.

The invention also relates to a mixture of an epoxy resin and a water soluble organic compound which occurs in at least 2 tautomeric forms, in one of which a labile hydrogen atom is linked to a carbon atom and which compound contains at least one carbonyloxy group or sulfonyl group.

The invention will be further described in the following unlimitative examples. As epoxy resin A is used therein a diglycidyl ether of bis-(4-hydroxyphenyl)-2,2-propane having an epoxy equivalent weight of 230–280 (available under the trade mark Epikote 834 of Shell Chemical). As epoxy resin B there is used a polyglycidyl ether of a phenol-formaldehyde novolac having an epoxy equivalent weight of 172–179 (available under the trade mark Den 431 of Dow Chemical). As curing agent A for the epoxy resin there is used an addition product of 36.36 parts by weight of a polyamidoamino resin having an amine equivalent weight of 150 (available under the trade mark Versamid 140 of Schering) to 11.42 parts by weight of the afore-mentioned epoxy resin Epikote 834. As curing agent B for the epoxy resin there is used an addition product of 36.36 parts by weight of the afore-mentioned polyamidoamino resin Versamid 140 to 8.70 parts by weight of a diglycidyl ether of bis-(4-hydroxyphenyl)methane having an epoxy equivalent weight of 187 (available under the trade mark Epikote DX 235 of Shell Chemical). Use is also made of a pigment mixture of 47.68 parts by weight of barium chromate, 31.71 parts by weight of rutile titanium dioxide and 30.21 parts by weight of aluminium silicate. All parts and percentages referred to are by weight.

EXAMPLE 1

To 103,57 parts of a solution of 47.78 parts of curing agent A in 18.58 parts of butyl glycol and 37.21 parts of an aromatic hydrocarbon (available under the trade mark Solvesso 100 of Esso) there were homogeneously added 109.60 parts of the pigment mixture and dispersed with a sand mill. The resulting product was homogeneously mixed with a solution of 47.78 parts of epoxy resin A in 12.09 parts of methyl cyanoacetate. Finally, 3 portions each of 100 g of demineralized water were added to the resulting mixture with stirring and it was found that a phase reversal of water in oil to oil in water had occurred after the second portion of water had been added.

EXAMPLE 2

Example 1 was repeated, with the exception that instead of 47.78 parts of epoxy resin A 34.10 parts of epoxy resin B were used.

EXAMPLE 3

Example 1 was repeated, with the exception that instead of 12.09 parts of methyl cyanoacetate 13.79 parts of ethyl cyanoacetate were used.

EXAMPLE 4

Example 1 was repeated, with the exception that instead of 12.09 parts of methyl cyanoacetate 15.98 parts of propyl cyanoacetate were used.

EXAMPLE 5

Example 1 was repeated, with the exception that instead of 12.09 parts of methyl cyanoacetate 13.21 parts of methyl chloroacetate were used.

EXAMPLE 6

Example 5 was repeated, with the exception that instead of 13.21 parts of methyl chloroacetate 14.92 parts of ethyl chloroacetate were used.

EXAMPLE 7

Example 1 was repeated, with the exception that instead of 12.09 parts of methyl cyanoacetate 14.93 parts of methyl 3-chloropropionate were used.

EXAMPLE 8

Example 1 was repeated, with the exception that instead of 45.78 parts of curing agent A 45.06 parts of curing agent B were used.

EXAMPLE 9

To 103.57 parts of a solution of 47.78 parts of curing agent A in 55,79 parts of an aromatic hydrocarbon (available under the trade mark Solvesso 100 of Esso) there were homogeneously added 109.60 parts of the pigment mixture and dispersed with a sand mill. The resulting product was homogeneously mixed with a solution of 47.78 parts of epoxy resin A in 12.09 parts of methyl cyanoacetate. Finally, 3 portions each of 100 g of demineralized water were added to the resulting mixture with stirring and it was found that a phase reversal of water in oil to oil in water had occurred after the second portion of water had been added.

TESTING AQUEOUS COMPOSITIONS

To an aluminium panel pre-treated in accordance with standard MIL-C-5541 each of the aqueous compositions was applied that had been obtained in the Examples 1-8. The compositions were sprayed onto the panel to a thickness of 16 $\mu$m (after drying) and were kept at a temperature of 21° C. for 180 minutes. Except for the case where the adhesion of the primer to the aluminium had to be measured, a polyurethane coating was sprayed onto the primer to a thickness of 30 $\mu$m (after drying), the composition and the properties of the polyurethane coating conforming to standard MIL-C-83286.

All eight aqueous compositions are in full conformity with the MIL-P-85582 standards set by the Department of Defense of the United States of America for use as aqueous primer for aircraft. These standards imply, int.al., that in an adhesion test of the primer carried out in accordance with ASTM-D-2197 there shall be no loss of adhesion; in the salt spray test for 1000 hours in accordance with ASTM-B-117 there shall be no formation of corrosion at a distance further than 0.5 mm from the scratch; nor shall there occur any corrosion at a distance further than 3.2 mm from the scratch in the filiform test for 500 hours in accordance with ASTM-D-2803; in the measurement of the so-called wet adhesion in accordance with U.S. Federal Standard 141, method 6301, there shall be no loss of adhesion; there shall be excellent resistance to water (more than 1200 g) measured in accordance with British Standard DEF 1053, No. 14, after 4 days' immersion of the panel in water of 50° C.; upon exposure to 3 different oils in accordance with MIL-L-23699, MIL-H-5605 and MIL-H-83282 for 24 hours at 121° C., 66° C. and 66° C., respectively, there shall be no loss of adhesion, no formation of blisters and no softening.

What is claimed is:

1. A water-reducible coating composition comprising an epoxy resin, an amino group-containing curing agent for it and an emulsifying auxiliary compound, characterized in that the emulsifying auxiliary compound is a water soluble organic compound which occurs in at least 2 tautomeric forms, in one of which a labile hydrogen atom is linked to a carbon atom and which compound contains at least one carbonyloxy group or sulfonyl group.

2. The coating composition of claim 1, wherein the emulsifying auxiliary compound is an alkyl cyanoacetate or an alkyl monochloroacetate.

3. The coating composition of claim 1, wherein the emulsifying auxiliary compound is the methyl or ethyl ester of cyanoacetic acid or of monochloroacetic acid.

4. The coating composition of claim 1, wherein the water soluble organic compound which occurs in at least 2 tautomeric forms is present in an amount such that 0.25–2 labile hydrogen toms are present per nitrogen atom of the amino group-containing curing agent.

5. A process for coating a substrate with a water-reducible composition, by applying the composition according to claim 1 to the substate and curing.

6. A mixture of an epoxy resin and a water soluble organic compound which occurs in at least 2 tautomeric forms, in one of which a labile hydrogen atom is linked to a carbon atom and which compound contains at least one carbonyloxy group or sulphonyl group.

7. The mixture of claim 6, also containing an organic solvent for the epoxy resin.

* * * * *

UNITED STATES PATENT AND TRADEMARK OFFICE
CERTIFICATE OF CORRECTION

PATENT NO. : 4,598,108
DATED : July 1, 1986
INVENTOR(S) : Cornelis A. M. HOEFS

It is certified that error appears in the above-identified patent and that said Letters Patent is hereby corrected as shown below:

On the cover page, in the title, after "REDUCIBLE" insert --COATING--.

Column 1, in the title, after "REDUCIBLE" insert --COATING--.

Columns 1 and 2, line 7, change the formula to appear as follows:

Column 4, line 58, change "103,57" to --103.57--.

Column 5, line 41, change "55,79" to --55.79--.

Column 6, line 47, change "toms" to --atoms--.

Column 6, line 56, change "sulphonyl" to --sulfonyl--.

Signed and Sealed this
Fourteenth Day of October, 1986

[SEAL]

*Attest:*

DONALD J. QUIGG

*Attesting Officer*  *Commissioner of Patents and Trademarks*